(12) United States Patent
Kaltchev et al.

(10) Patent No.: US 11,435,913 B2
(45) Date of Patent: Sep. 6, 2022

(54) STORAGE POLICY MATCHING USING DIFFERENCE-BASED SCORING

(71) Applicant: VMware, Inc., Palo Alto, CA (US)

(72) Inventors: Viktor Kaltchev, Sofia (BG); Lyubomir Pishinov, Sofia (BG); Dian Nikolov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 292 days.

(21) Appl. No.: 16/685,741

(22) Filed: Nov. 15, 2019

(65) Prior Publication Data

US 2021/0149572 A1    May 20, 2021

(51) Int. Cl.
*G06F 9/455* (2018.01)
*G06F 3/06* (2006.01)

(52) U.S. Cl.
CPC .......... *G06F 3/0632* (2013.01); *G06F 3/0604* (2013.01); *G06F 3/067* (2013.01); *G06F 3/0664* (2013.01); *G06F 9/45558* (2013.01); *G06F 2009/45562* (2013.01)

(58) Field of Classification Search
CPC .... G06F 3/0632; G06F 3/0604; G06F 3/0664; G06F 3/067; G06F 9/45558; G06F 2009/45562
See application file for complete search history.

(56) References Cited

U.S. PATENT DOCUMENTS

| | | | |
|---|---|---|---|
| 9,621,427 B1 * | 4/2017 | Shah | G06F 9/45533 |
| 9,983,807 B1 * | 5/2018 | Tylik | G06F 3/0604 |
| 10,558,476 B1 * | 2/2020 | Bhardwaj | G06F 9/45533 |
| 2012/0102291 A1 * | 4/2012 | Cherian | G06F 3/067 |
| | | | 711/170 |

* cited by examiner

*Primary Examiner* — Wissam Rashid
(74) *Attorney, Agent, or Firm* — Patterson & Sheridan, LLP (57) ABSTRACT

Certain embodiments described herein are generally directed to selecting a target storage profile for comparison to a recovered storage profile in support of a data recovery operation. In some embodiments, a method includes comparing a first plurality of fields of the reference storage profile with a second plurality of fields of a first target storage profile of the one or more target storage profiles to determine a degree to which the first target storage profile matches the reference storage profile, the first plurality of fields comprising a first plurality of storage requirements, and the second plurality of fields comprising a second plurality of storage requirements.

18 Claims, 5 Drawing Sheets

STORAGE POLICY MATCHING USING DIFFERENCE-BASED SCORING

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines (VMs) generated on the host computers may use the datastore, for example, to store virtual disks (each virtual disk implemented as one or more virtual disk files) that are accessed by the virtual machines during their operation. Because the shared local disks that make up the datastore may have different performance characteristics (e.g., capacity, input/output operations per second (IOPS) capabilities, etc.), usage of such shared local disks to store virtual disks or portions thereof may be distributed among the virtual machines based on the needs of each given virtual machine.

Thus, an important consideration for the architecture of a virtual datastore includes the provisioning of virtual machines to the proper storage (e.g., storing the virtual disk files of the virtual machines on the proper storage) such that a storage profile of the storage meets certain service level agreements (SLAs) or other service goals. For example, a storage profile may be selected based upon capacity, performance, availability, redundancy, etc., needed for a particular application running on the VM. Another important consideration includes maximizing the availability of the services provided by the virtual machines. Availability solutions are designed to improve the resiliency of local systems or entire sites. Data recovery is an availability solution for recovering all or a portion of a datacenter from replicated data. However, successful data recovery may be dependent on whether the replicated data is instantiated in a proper datastore having a storage profile that is compatible with a storage profile associated with the replicated data.

DETAILED DESCRIPTION

Embodiments herein provide techniques for comparing storage profiles of several instances of datastores with a reference storage profile corresponding to recovered data, to determine whether any of the several instances of datastores are compatible with the recovered data. While certain aspects of the disclosure are described with respect to recovered data, it should be noted that the provided techniques may be used with any suitable data and can support any suitable data function. For example, the provide techniques may be used for data migration (e.g., virtual machine (VM) migration), data instantiation (e.g., VM instantiation), data duplication (e.g., VM duplication), etc.

In some examples, the reference storage profile is a data structure that indicates requirements and/or desired requirements ("performance characteristics") of a storage that backs a recovered VM, and is located on a first server (e.g., vCenter server). Other instances of storage profiles may correspond to other VMs or programs, and may be located on other servers (e.g., another vCenter server in another location). Each storage profile may be characterized by a plurality of fields (e.g., compare points) indicative of storage policies of the underlying datastore associated with that storage profile. The techniques disclosed herein provide for improved data recovery by allowing comparison of a broad range of fields and their corresponding performance characteristics to ensure the recovered data is instantiated in a datastore having a proper storage profile.

Figure 1:
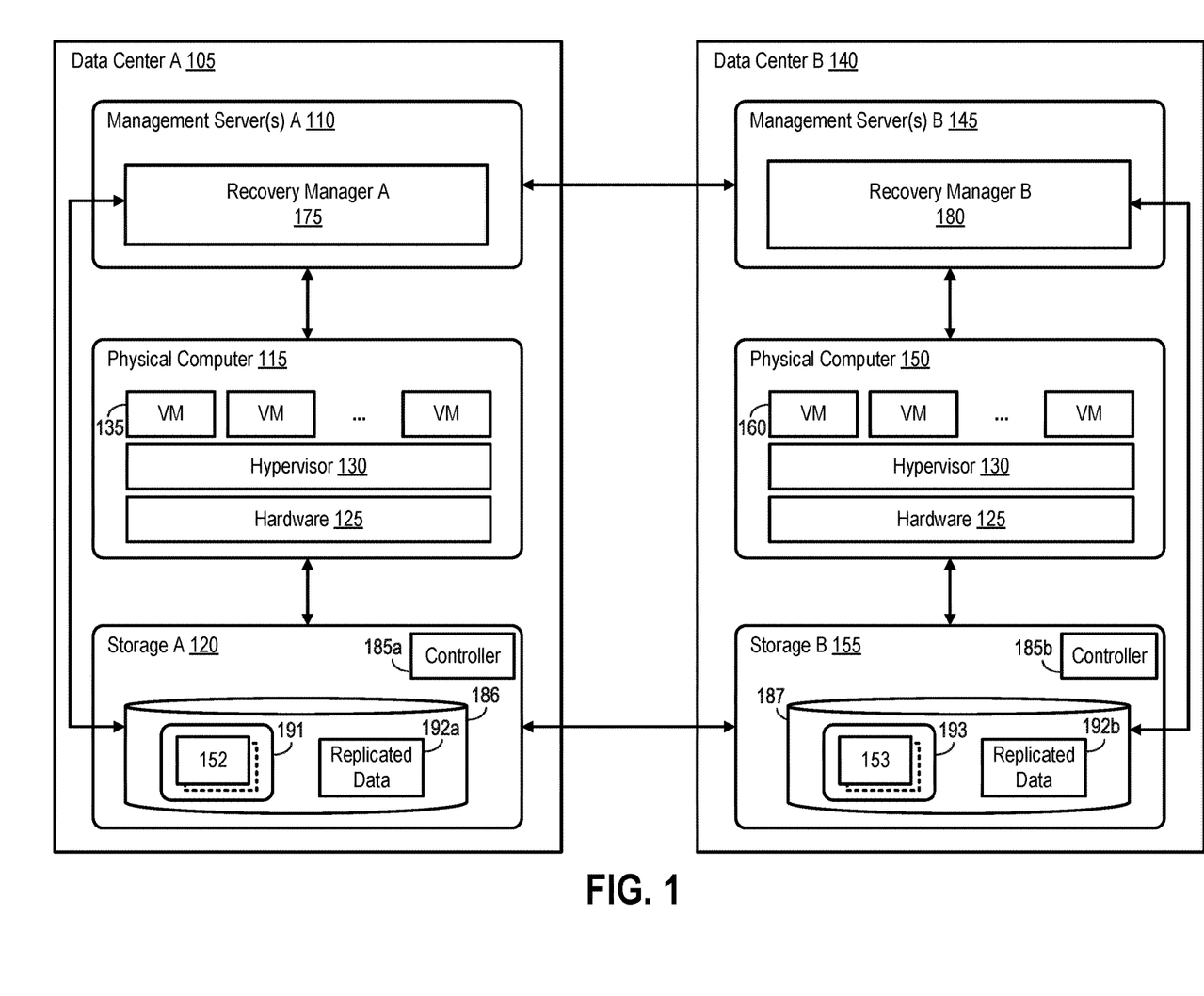
FIG. 1 is a block diagram conceptually illustrating exemplary data centers, according to some aspects of the disclosure.

FIG. 1 is a block diagram illustrating exemplary data centers (e.g., data center A 105 and data center B 140) configured to retrieve a reference storage profile and compare the contents of existing, target storage profiles to the reference storage profile. Datacenter A 105 includes management server A 110, one or more host devices 115, and storage A 120. Each host device 115 includes hardware 125 (e.g., memory, processor, network interface card (NIC), etc.), a hypervisor 130 (also referred to as a virtualization software layer), and virtual machines (VMs) 135. Each management server 110 may also include hardware (e.g., memory, processor, network interface card (NIC), etc.).

Similarly, datacenter B 140 includes management server B 145, one or more host devices 150, and storage B 155. Each host device 150 includes hardware 125, hypervisor 130, and VMs 160. In one embodiment, datacenter A 105 represents a first datacenter site and datacenter B 140 represents a second, geographically distinct datacenter site, wherein components of datacenter A 105 are communicatively coupled to components of datacenter B 140. While various components are illustrated as being directly coupled for the ease of explanation (e.g., to illustrate the direction of replicated data), a network including one or more switches or routers may lie between datacenter A 105 and datacenter B 140 and facilitate the coupling of the various components.

VMs 135/160 are complete computation environments, containing virtual equivalents of the hardware and system software components of a physical system and are typically implemented by an extensive virtualization infrastructure, which includes a variety of software and hardware components. For example, one or more of the VMs 135/160 may implement virtual desktops. A virtual desktop is a virtual computing system that operates as a desktop or workstation computer with which an end user can interact using a desktop remoting protocol over a network. In one embodiment, one or more of the VMs 135/160 implement a virtualized computing, networking, storage, or security service (e.g., a firewall, webserver, database server, etc.). Though certain aspects are described with respect to VMs, it should be noted that such aspects may equally apply to other virtual computing instances (VCIs) such as containers.

Hypervisor 130 runs on hardware 125 of host device (e.g., a physical computer) 115/150 and manages one or more VMs 135/160. Hypervisor 130 manages physical resources, (e.g., hardware 125), as well as maintains virtual-to-physical hardware mappings. For example, hypervisor 130 may manage VM access to a processor, memory, or network interface within hardware 125 as well as a virtual disk for each VM implemented as one or more virtual disk files stored on underlying storage 120/155.

Each of storage A 120 and storage B 155 includes one or more physical storage devices, and may be partitioned into logical units, volumes, virtual volumes, and/or disks (which are collectively referred to herein as logical storage devices) that are stored on the one or more physical storage devices (e.g., storage array 186/187). In one embodiment, storage A 120 and storage B 155 include storage controllers 185*a*/185*b* configured to serve read and write requests and management commands/queries from host devices 115/150 and management servers 110/145. Each of storage A 120 and storage B 155 may be configured as a shared storage system, such as a network-attached storage (NAS) or a block-based device over a storage area network (SAN). In some embodiments, storage A 120 and storage B 155 may be implemented as software-defined storage such as VMware Virtual SAN made commercially available from VMware, Inc., that clusters together server-attached hard disks and/or solid state drives (HDDs and/or SSDs), to create a flash-optimized, highly resilient shared datastore designed for virtual environments.

While storage systems (e.g., storage A 120 and storage B 155) are typically made up of a plurality of disks, other forms of storage, such as solid-state non-volatile storage devices, may be used. The term "disk," as used herein, should therefore not be construed as limited only to rotating disk storage media, but may also be construed to encompass solid state disks (SSDs). In some embodiments, the storage systems include high-density non-volatile memory. Furthermore, while the storage systems are depicted as a separate, external component to host 115/150, the storage systems may be internal to hosts 115/150, for example, a local storage device or locally attached storage. In some embodiments, one or more of storage A 120 and storage B 155 may be accessible by multiple hosts 115/150 via a data network implemented using any suitable wired and/or wireless network(s) including one or more data buses, one or more local area networks (LANs), one or more wireless LANs, one or more cellular networks, the Internet, etc.

As described above, storage goals or requirements, such as performance, availability, or other SLAs, can be associated with storage profiles. For example, a storage administrator using a management server (e.g., management server A 110 or management server B 145) may define a storage profile 191 indicating one or more performance characteristics, and associates that storage profile 191 with one or more logical storage devices 152 that meet the performance characteristic with the storage profile 191. Generally, a storage profile 191 is associated with one or more logical storage devices that can be treated as a single datastore based upon common storage capabilities. For example, storage profile 191 may be defined by a user or an application for a defined set of one or more performance characteristics (e.g., for a particular VM), and may be associated with datastores that meet the one or more performance characteristics of the storage profile 191.

In certain aspects, storage profile 191 can represent a particular set of one or more performance characteristics that are organized as a data structure. For example, the storage profile 191 can be labeled by a profile name. The profile name may be implemented through the use of tags stored in metadata for the corresponding logical storage devices 152 of the storage profile 191. In some examples, the profile name can be a generalization of the requirements or desired requirements of the storage profile 191.

The storage profile 191 may include one or more sub-profiles that contain one or more capabilities. For example, any particular storage profile may include a sub-profile that contains a collection of storage capabilities corresponding to one or more logical storage devices 152. Next, a capability may contain a collection of constraints that describe what the corresponding VM 135 expects from the storage (e.g., one or more logical storage devices). In some examples, each storage profile 191 contains one or more storage capabilities that relate to performance characteristics indicative of capacity, storage space reservation, failure tolerance, cache size, read performance (e.g., read operations, read latency), write performance (e.g., write operations, write latency), availability, redundancy, if the storage must do periodic backups, etc.

Generally, each constraint contains a collection of one or more properties for a single occurrence of a capability, where each property is a storage requirement for the VM 135. For example, such properties may indicate performance characteristics such as a transmission latency between two physical computing machines, a minimum storage capacity, a networking bandwidth, minimum CPU cycles per hour per virtual machine, and other such constraints for each capability.

In one embodiment, a storage performance characteristic associated with a storage profile is represented by a key-value pair, where the key is a specific property that the logical storage device can offer and the value is a metric, or a range, that the logical storage device guarantees for a provisioned object, such as a virtual machine metadata object or a virtual disk. In one embodiment, logical storage devices 152 are associated with a storage profile 191 through the use of tags stored in metadata for the corresponding logical storage devices and/or in a data structure maintained by management server A 110.

For example, the management server 110/140 may associate a VM 135/160 with a storage profile through the use of tags stored in metadata for the corresponding logical storage devices 152/153. The association of a VM 135/160 with a storage profile 191/193 indicates that the VM 135/160 should be backed by (e.g., virtual disks of the VM 135/160 should reside on) one or more of the logical storage devices associated with the storage profile. A VM 135/160 may be associated with a storage profile based upon at least a requirement for a minimum storage capability. For example, a storage administrator or the application administrator (end user) for VM 135 may use management server A 110 to create an association between VM 135 and a corresponding storage profile. The administrator may associate a high-priority VM with a storage profile that guarantees a high level of storage performance/reliability and low-priority VM with a storage profile that does not guarantee such a high level of storage performance/reliability. In one embodiment, VMs are associated with a storage profile through the use of a tag stored in metadata for the corresponding VM.

Management servers 110/145 may include recovery managers 175/180. The recovery managers 175/180 provide administrative access to define recovery plans (e.g., a preferred recovery type, failover policies, etc.). Recovery managers 175/180 further provide the implementation for unplanned failover, planned failover, test failover, and other data availability/recovery workflows. Additionally, as described further herein, recovery managers 175/180 automate the protection of virtual machines for data recovery.

In one embodiment, the recovery managers 175/180 implement a recovery workflow by replicating a VM 135/160 and a corresponding storage profile 191/193, and storing the replicated data 192a/192b. That is, data and metadata corresponding to the VM 135/160 and an associated storage profile of the VM are replicated and stored in a physical storage device (e.g., array 186/187) separate from the VM 135/160 and its associated storage profile. In some examples, the replicated data is stored in the same datacenter associated with the VM 135/160 and its corresponding storage profile.

For example, VM 135 may correspond to a first storage profile 191 associated with one or more logical storage devices 152 of array 186. That is, VM 135 may utilize at least a first logical storage device 152 for read and write storage commands, where at least the first logical storage device 152 is associated with the first storage profile 191. In this example, recovery manager A 175 of datacenter A 105 may replicate VM 135 and the first storage profile 191, and store the replicated data 192a in a separate location of the array 186 of storage A 120. In another example, the recovery manager A 175 of datacenter A 105 may replicate VM 135 and the first storage profile 191, and store the replicated data 192b in storage B 155 of datacenter B 140. Similarly, VM 160 may correspond to a second storage profile 193 associated with one or more logical storage devices 153 of array 187. In this example, recovery manager B 180 of datacenter B 140 may replicate VM 160 and the second storage profile 193, and store the replicated data 192b in a separate location of the array 187 of storage B 155. It should be noted that, the recovery manager A 175 of datacenter A 105 may replicate VM 135 and the first storage profile 191, and store the replicated data 192b in storage B 155 of datacenter B 140.

In one embodiment, recovery manager 175/180 is configured to recover a replicated VM by retrieving the replicated data 192a/192b and creating a copy of corresponding VM 135/160 on a target physical storage device (e.g., array 186/187) using logical storage devices associated with a storage profile that is identical or similar to the replicated storage profile.

However, prior to recovery of the replicated VM, the recovery manager 175/180 may be configured to compare storage profiles of a local storage and/or a remote storage to determine if any existing, target storage profiles are compatible with the replicated storage profile (e.g., a reference storage profile) corresponding to the replicated VM. That is, the recovery manager 175/180 may retrieve reference storage profile data from replicated VM data and compare it to target storage profile data.

In one example, the recovery manager 175/180 compares a first plurality of fields of the reference storage profile with a second plurality of fields of a first target storage profile to determine whether the first target storage profile satisfies a plurality of equality conditions, where the plurality of equality conditions correspond to the first plurality of fields of the reference storage profile. That is, the recovery manager 175/180 compares the first plurality of fields with the second plurality of fields to determine whether the reference storage profile and the first target storage profile are equal. As noted above, the reference storage profile corresponds to a storage resource (e.g., one or more logical storage devices) of a source datacenter used to store a VM, and the first target storage profile corresponds to a first target storage resource (e.g., one or more logical storage devices) of a target datacenter.

In some examples, each of the first plurality of fields and the second plurality of fields comprise at least one of a name of the corresponding storage profile, a sub-profile of the corresponding storage profile, a capability corresponding to the sub-profile, a constraint corresponding to the capability, and a property corresponding to the constraint, wherein the property comprises an identifier and a property value (e.g., a metric, or a range, that the logical storage device guarantees for the VM). In some examples, each field is a compare point that the recovery manager 175/180 uses to compare the reference storage profile to the first target storage profile.

In some examples, the recovery manager 175/180 determines a first value corresponding to the first target storage profile based on which of the plurality of equality conditions the first target storage profile satisfies. That is, the recovery manager 175/180 is configured to score the first target storage profile based on a comparison of one or more of the first plurality of fields with one or more of the second plurality of fields. In some examples, the score is indicative of whether the reference storage profile is compatible with the first target storage profile, and also, whether the replicated VM is compatible with the first target storage profile.

In some examples, the recovery manager 175/180 is configured to adjust a first counter value based on whether the equality condition is satisfied for each of the first plurality of fields, where the first counter value is indicative of the first value. That is, the recovery manager 175/180 may adjust the first counter value based on whether each of the first plurality of fields are equal to one or more of the second plurality of fields. In some examples, the recovery manager 175/180 may adjust the first counter value according to a degree to which one or more of the plurality of equality conditions are satisfied between each of the first plurality of fields and one or more of the second plurality of fields.

For example, the recovery manager 175/180 may compare a profile name of the reference storage profile to a name of the first target storage profile to determine whether the names match (e.g., whether an equality condition is satisfied between the two names). In some examples, the recovery manager 175/180 may adjust the first counter value based on the degree to which the name of the reference storage profile and the name of the first target storage profile match. In one example, if the two names are different, the recovery manager 175/180 may adjust the counter by adding 1000 points (e.g., an integer value) to the first counter value. In another example, if the two names are different but start with the same alphanumeric characters, or if the two names share one or more words, the recovery manager 175/180 may adjust the counter by adding 1 point to the first counter value.

In another example, the recovery manager 175/180 may compare each sub-profile of the reference storage profile with one or more sub-profiles of the first target storage profile. In this example, the recovery manager 175/180 may adjust the first counter value using the same rules as described above for the profile name.

In another example, the recovery manager 175/180 may compare each capability of the reference storage profile to one or more capabilities of the first target. In some cases, if a capability from the reference storage profile does not exist or is otherwise missing from the first target storage profile, then the recovery manager 175/180 may adjust the first counter value to add 100 points to the counter value for each capability missing from the first target storage profile. In some examples, the recovery manager 175/180 may determine that the first target storage profile contains all the same capabilities as the reference storage profile. In such an example, the recovery manager 175/180 may refrain from adjusting the first counter value. However, if the recovery manager 175/180 determines that the first target storage profile contains additional capabilities that do not exist or are otherwise missing from the reference storage profile, the recovery manager 175/180 may adjust the first counter value by adding 10 points for every capability included in the first target storage profile that does not exist in the reference storage profile.

In another example, the recovery manager 175/180 may compare each constraint of the reference storage profile to one or more constraints of the first target storage profile to determine whether all the constraints in the reference storage profile are also present in the first target storage profile. In some cases, if a constraint from the reference storage profile does not exist or is otherwise missing from the first target storage profile, then the recovery manager 175/180 may return an error (e.g., return a −1) and end the comparison of the reference storage profile and the first target storage profile. In some examples, the recovery manager 175/180 may determine that the first target storage profile contains all the same constraints as the reference storage profile. In such an example, the recovery manager 175/180 may refrain from adjusting the first counter value. However, if the recovery manager 175/180 determines that the first target storage profile contains additional constraints that do not exist or are otherwise missing from the reference storage profile, the recovery manager 175/180 may adjust the first counter value by adding 10 points for every constraint included in the first target storage profile that does not exist in the reference storage profile.

In another example, the recovery manager 175/180 may compare each property of the reference storage profile to one or more properties of the first target storage profile to determine whether all the properties in the reference storage profile are also present in the first target storage profile. For example, the recovery manager 175/180 may compare an identifier of each property of the reference storage profile with an identifier of one or more properties in the first target storage profile. In some cases, if a property identifier from the reference storage profile does not exist or is otherwise missing from the first target storage profile, then the recovery manager 175/180 may adjust the first counter value to add 100 points to the counter value for each property missing from the first target storage profile. In some examples, the recovery manager 175/180 may determine that the first target storage profile contains all the same properties as the reference storage profile (e.g., the first target storage profile contains all the same property identifiers as the reference storage profile). In such an example, the recovery manager 175/180 may refrain from adjusting the first counter value. However, if the recovery manager 175/180 determines that the first target storage profile contains additional properties that do not exist or are otherwise missing from the reference storage profile, the recovery manager 175/180 may adjust the first counter value by adding 1 point for every property included in the first target storage profile that does not exist in the reference storage profile.

In another example, the recovery manager 175/180 may compare a value of each property of the reference storage profile with a value of one or more properties in the first target storage profile. For example, the recovery manager 175/180 may adjust the first counter value by adding 1 point for every property in the first target storage profile having an identifier that is the same as an identifier in the reference storage profile, but has a different value associated with the property.

It should be noted that the amounts of points described above are not limited to the stated amounts, and may vary to include any suitable number of points.

In some examples, the recovery manager 175/180 may be configured to compare the first value of the first target storage profile with one or more additional values corresponding to one or more additional target storage profiles, and select one target storage profile among the first target storage profile and the one or more additional target storage profiles based on the comparison. For example, the recovery manager 175/180 may score the first target storage profile based on a comparison of each of the first plurality of fields of the reference storage profile with one or more of the second plurality of fields of the first target storage profile to determine the first value. The recovery manager 175/180 may also compare the first plurality of fields of the reference storage profile with one or more additional target storage profiles, and determine one or more additional values corresponding to each additional comparison. The recovery manager 175/180 may then compare the first value with the one or more additional values, to determine which one of the first target storage profile and the additional target storage profiles is most compatible with the VM.

The recovery manager 175/180 may then select the target storage profile determined to be the most compatible with the VM, and instantiate the VM on the target storage resource associated with the selected target storage profile. For example, the recovery manager 175/180 may then select the target storage profile with a score that is equal to zero, or a score that is closest to zero and is not a negative number.

Figure 2:
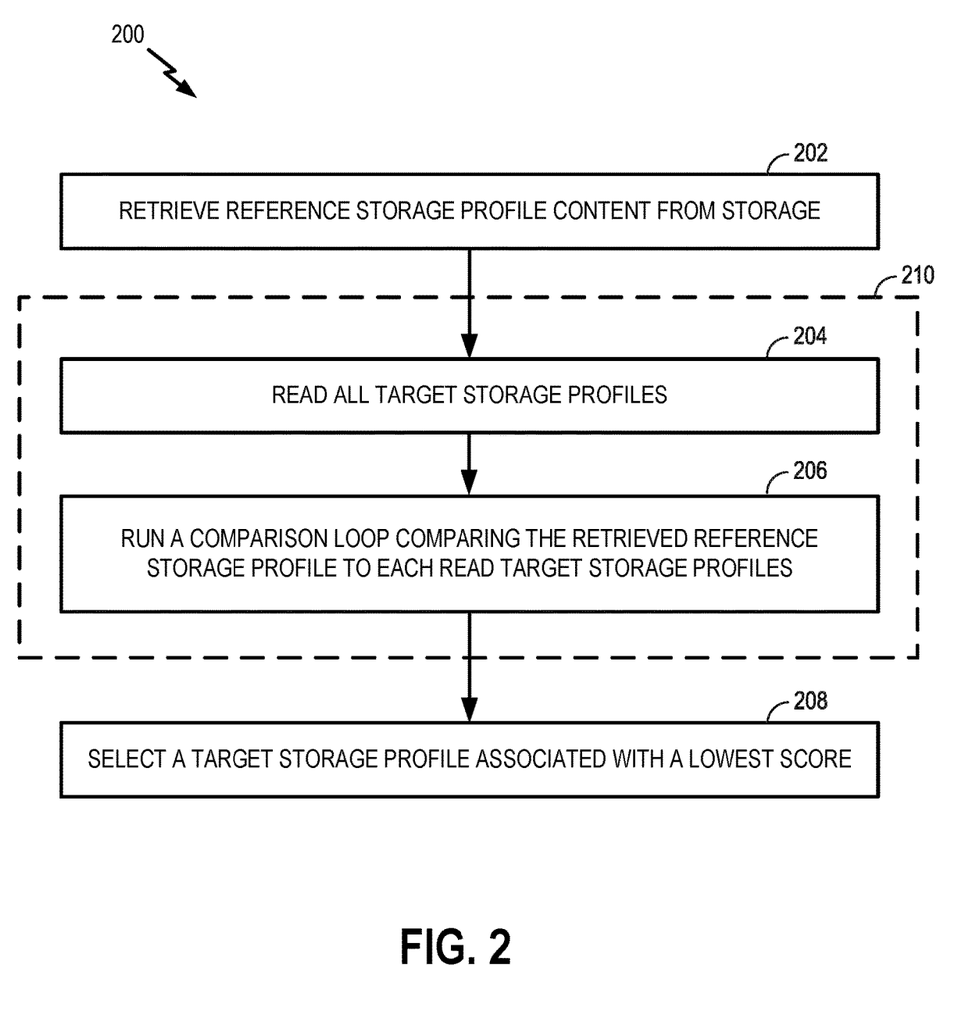
FIG. 2 is a flow chart illustrating an exemplary method for determining a compatible target storage resource for recovery of a virtual machine (VM), according to some aspects of the disclosure.

FIG. 2 is a flow chart that illustrates an exemplary method 200 for determining a compatible target storage resource for recovery of a VM, according to some embodiments of the disclosure. In some examples, the method 200 may be carried out by a specialized processor or software (e.g., recovery manager 175/180 of FIG. 1) configured to run on a processor of a server (e.g., the management server 110/145 of FIG. 1) or any suitable computing device. In some examples, the method 200 may be carried out by any suitable apparatus or means for carrying out the functions or algorithms described below.

Initially, the recovery manager 175/180 may retrieve, at block 202, contents of a reference storage profile from replicated data (e.g., replicated data 192a/192b) stored in a recovery storage resource (e.g., storage A 120 and/or storage B 155). The recovery manager 175/180 may also read, at block 204, all existing storage profile contents of another storage resource (e.g., storage A 120 and/or storage B 155). For example, recovery manager 175 may retrieve a reference storage profile from replicated data 192a/192b stored in any of storage A 120 or storage B 155, and compare it to an existing storage profile (e.g., a target storage profile 191/193 in any of storage A 120 or storage B 155). It should be noted that the recovery manager 175/180 may run, at block 206, a comparison loop, and keep a score for each target storage profile 191/193, where the score is indicative of a degree of difference between a corresponding target storage profile 191/193 and the reference storage profile. Accordingly, after running the comparison loops, the recovery manager 175/180 may select, at block 208, the target storage profile 191/193 having the lowest score (e.g., select the target storage profile 191/193 having a numeric score that is equal to, or closest to, zero while not being a negative number).

That is, the score of each target storage profile 191/193 indicates how different the storage profile is from the reference storage profile, depending on how much greater the score is to zero, where a score of zero indicates no difference. A target storage profile having a score that is equal to zero is identical to the reference storage profile, or at least includes all the same performance characteristics of the reference storage profile. As noted above, the scoring can be the result of a determination of a degree to which a performance characteristic of a target storage profile 191/193 matches a corresponding performance characteristic of the reference storage profile (e.g., a determination of whether the target storage profile satisfies an equality condition). Block 210 of FIG. 2 indicates a portion of the method 200 that is described in more detail below with reference to FIGS. 3 and 4.

Figure 3:
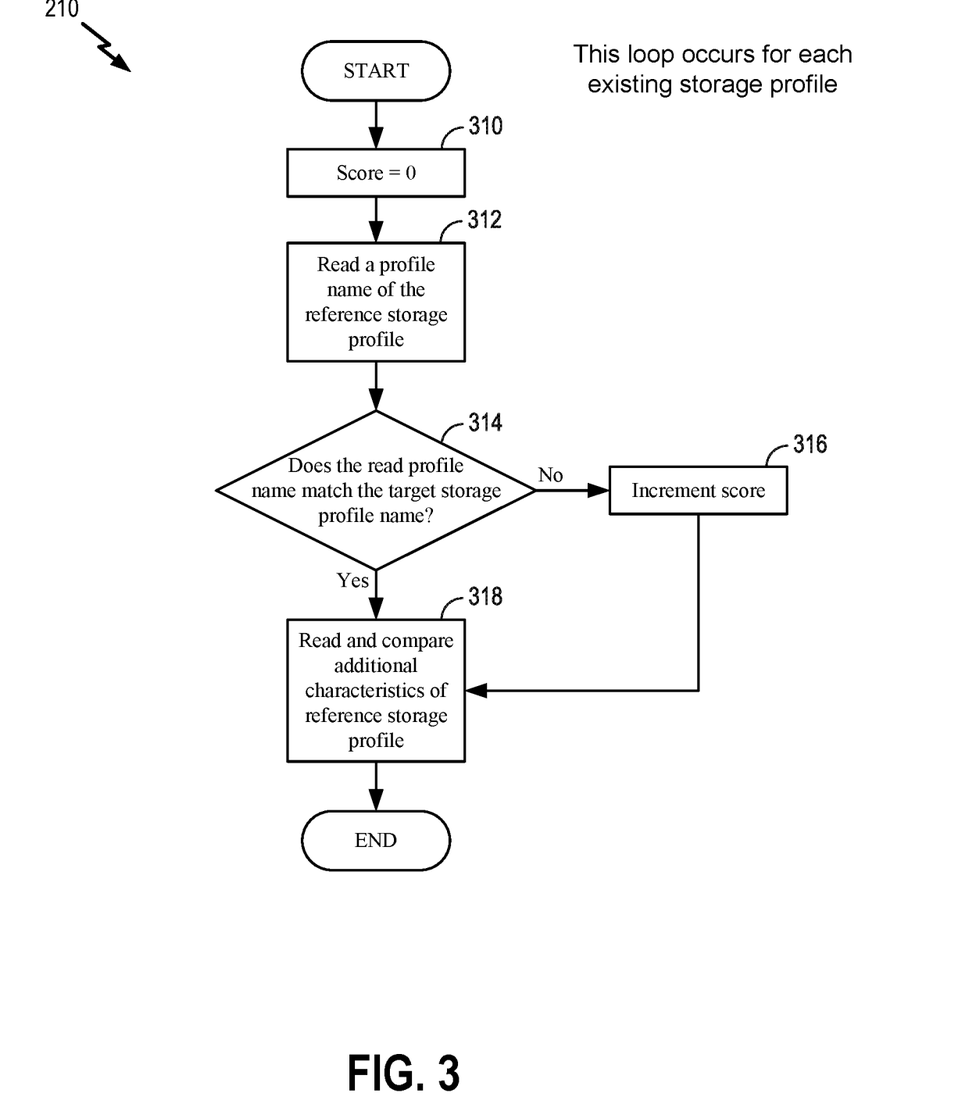
FIG. 3 is a flow chart illustrating an exemplary method for comparing a profile name and performance characteristics of a reference storage profile with those of a target storage profile, according to some aspects of the disclosure.

FIG. 3 is a flow chart illustrating an exemplary method 210 for comparing a profile name and performance characteristics of the reference storage profile with those of each target storage profile 191/193, according to some aspects of the disclosure. In some examples, the method 210 may be carried out by a specialized processor or software (e.g., recovery manager 175/180 of FIG. 1) configured to run on a processor of a server (e.g., the management server 110/145 of FIG. 1) or any suitable computing device. In some examples, the method 210 may be carried out by any suitable apparatus or means for carrying out the functions or algorithms described below. In some embodiments, the method 210 may be repeated for each target storage profile 191/193.

Initially, at block 310, the recovery manager 175/180 may initially set the score for each target storage profile 191/193, prior to a comparison, to zero. It is appreciated, however, that the values recited throughout the description are examples, and may be changed to different values. In other examples within the scope of the present disclosure, the recovery manager 175/180 may initially set the score to any suitable number (e.g., integer) that acts as a baseline value prior to a comparison. The recovery manager 175/180 may then read, at block 312, a profile name from a field of the retrieved reference storage profile and determine, at block 314, whether a target storage profile 191/193 being compared to the reference storage profile has a matching profile name. If the name of the target storage profile 191/193 does not match (e.g., the profile names do not match entirely, or there is only some degree of matching in the profile names) the reference storage profile, the method 210 moves on to block 316 where the score corresponding to the target storage profile is incremented according to the degree to which the profile names do not match. In some cases, the score may be manually assigned by a user, or the user may manually assign values for each determined difference.

If the recovery manager 175/180, at block 314, determines that the target storage profile 191/193 being compared to the reference storage profile has a matching profile name, then the method 210 moves on to block 318 without incrementing the score of the target storage profile. At block 318, the recovery manager 175/180 reads performance characteristics from the reference storage profile, and compares them to the target storage profile 191/193 to determine whether the target storage profile has a matching performance characteristic. Note that block 318 is described in additional detail below with respect to FIG. 4. Once the recovery manager 175/180 has read and compared all of the performance characteristics of the reference storage profile with the target storage profile 191/193 (or determines that a comparison returns an error), the recovery manager 175/180 may end the method 210 for the target storage profile 191/193, and repeat the method 210 for another target storage profile 191/193.

Figure 4:
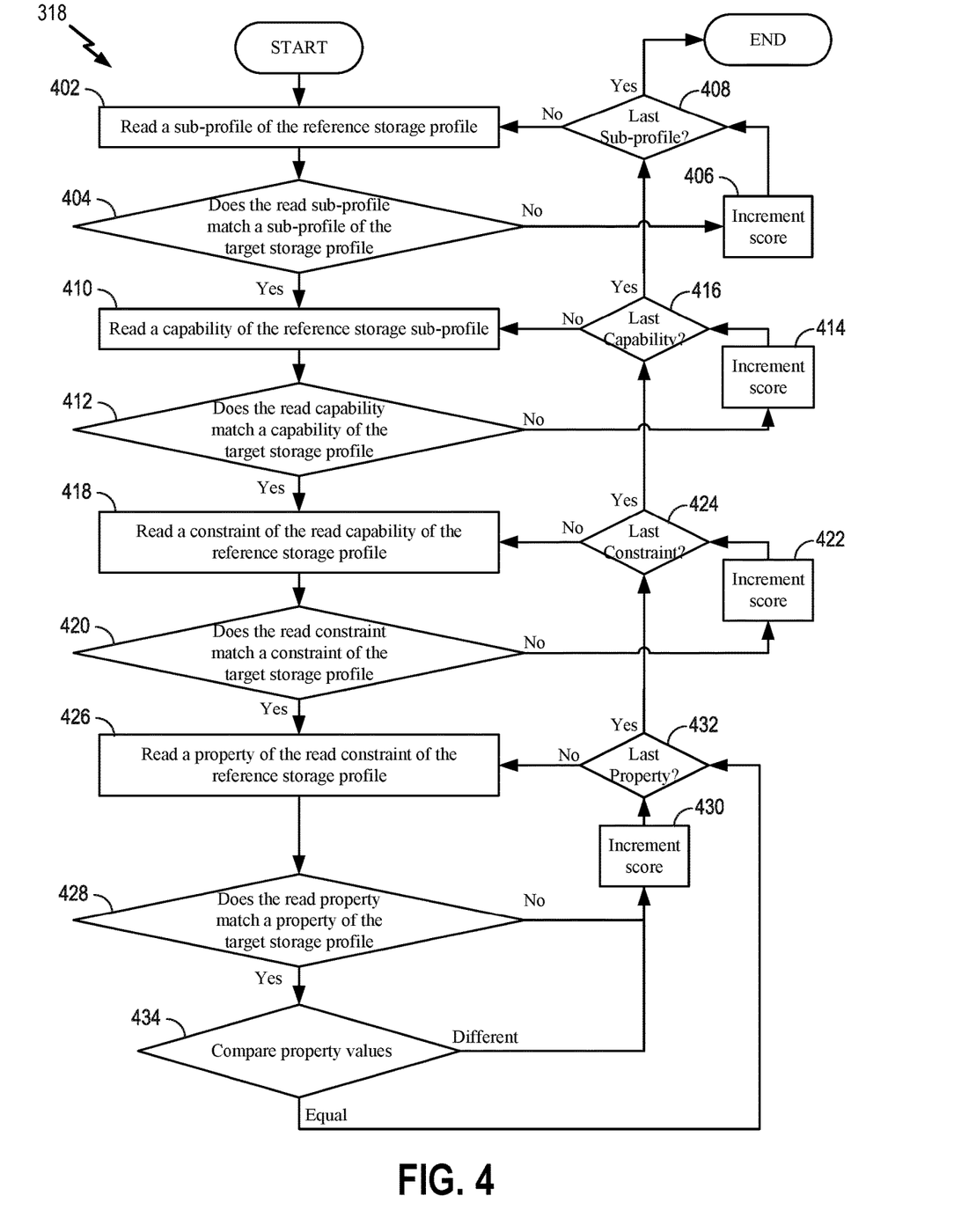
FIG. 4 is a flow chart illustrating an exemplary method for reading and comparing performance characteristics of a reference storage profile with those of a target storage profile, according to some aspects of the disclosure.

FIG. 4 is a flow chart illustrating an exemplary method 318 for reading and comparing performance characteristics of a reference storage profile with those of a target storage profile, according to some aspects of the disclosure. As used herein, "performance characteristics" relate to binary values or specific values corresponding to fields of a storage profile such as a profile name field, a sub-profile field, a capability field, a constraint field, and a property field. It should be noted that one or more fields may be removed and additional fields may also be added as "performance characteristics" without departing from the novel features disclosed herein. In some examples, the method 318 may be carried out by a specialized processor or software (e.g., recovery manager 175/180 of FIG. 1) configured to run on a processor of a server (e.g., the management server 110/145 of FIG. 1) or any suitable computing device. In some examples, the method 318 may be carried out by any suitable apparatus or means for carrying out the functions or algorithms described below.

At block 402, the recovery manager 175/180 reads a first sub-profile of the reference storage profile. The method 318 may then move on to block 404, where the recovery manager 175/180 compares the first sub-profile read from the reference storage profile with one or more sub-profiles of a target storage profile 191/193 to determine if there is a match. If a target storage profile 191/193 does not have a sub-profile that matches the sub-profile of the reference storage profile, then the method 318 moves on to block 406, where the score of the target storage profile 191/193 is incremented according to the degree to which the first sub-profile is not matched (e.g., a comparison may reveal similarities between the compared sub-profiles, or no similarities at all). At block 408, the recovery manager 175/180 determines whether the first sub-profile of the reference storage profile that was subject to the comparison was the last sub-profile of the reference storage profile. If the first sub-profile was the last, then the method 318 may end for that particular target storage profile 191/193. If the first sub-profile was not the last, the method 318 moves back to block 402, where a second sub-profile is read from the reference storage profile.

However, if, at block 404, the recovery manager 175/180 determines that the target storage profile 191/193 has a sub-profile that matches the first sub-profile of the reference storage profile, the method may proceed to block 410, where a first capability of the first sub-profile is read from the reference storage profile. The method may then move on to block 412, where the recovery manager 175/180 determines if the first capability read from the first sub-profile matches one or more capabilities of the target storage profile 191/193. If there is no match, the method 318 moves on to block 414, where the recovery manager 175/180 increments the score of the target storage profile 191/193.

The method 318 then moves on to block 416 where the recovery manager 175/180 determines if the first capability was the last capability of the first sub-profile. If the first sub-profile has no additional capabilities, the method 316 may proceed to block 408. However, if the recovery manager 175/180 determines that the first sub-profile includes a second capability, the method 318 moves on to block 410 where the second capability is read.

However, if, at block 412, the recovery manager 175/180 determines that the target storage profile 191/193 has a capability that matches the first capability of the reference storage profile, the method may proceed to block 418, where a first constraint of the first capability is read from the reference storage profile. The method may then move on to block 420, where the recovery manager 175/180 determines if the first constraint read from the first capability matches one or more constraints of the target storage profile 191/193. If there is no match, the method 318 moves on to block 422, where the recovery manager 175/180 increments the score of the target storage profile 191/193.

The method 318 then moves on to block 424 where the recovery manager 175/180 determines if the first constraint was the last constraint of the first capability. If the first capability has no additional constraints, the method 316 may proceed to block 416. However, if the recovery manager 175/180 determines that the first capability includes a second constraint, the method 318 moves on to block 418 where the second constraint is read.

In some embodiments, if the target storage profile 191/193 does not include a constraint that matches the first constraint of the reference storage profile, the recovery manager 175/180 may return an error and end the method 318 for that particular target storage profile 191/193 before reading any more constraints.

However, if, at block 420, the recovery manager 175/180 determines that the target storage profile 191/193 has a constraint that matches the first constraint of the reference storage profile, the method may proceed to block 426, where a first property of the first constraint is read from the reference storage profile. The method may then move on to block 428, where the recovery manager 175/180 determines if the first property read from the first constraint matches one or more properties of the target storage profile 191/193. If there is no match, the method 318 moves on to block 430, where the recovery manager 175/180 increments the score of the target storage profile 191/193.

From block 430, the method 318 then moves on to block 432 where the recovery manager 175/180 determines if the first property was the last property of the first constraint. If the first constraint has no additional constraints, the method 316 may proceed to block 424. However, if the recovery manager 175/180 determines that the first constraint includes a second property, the method 318 moves on to block 426 where the second property is read.

However, if, at block 428, the recovery manager 175/180 determines that the target storage profile 191/193 has a property that matches the first property of the reference storage profile, the method may proceed to block 434, where the recovery manager 175/180 determines whether a value of the first property of the reference storage profile matches a value of the corresponding property of the target storage profile 191/193. If the values are different, the method 318 moves on to block 430. If the values match (e.g., are equal), the method 318 moves on to block 432.

It should be noted that the equality conditions shown in blocks 404, 412, 420 and 428 may provide for partial matches. That is, for example, a sub-profile of a target storage profile may partially match the first sub-profile of the reference storage profile. In such a case, the method 318 may both increment the score according to the partial match at block 406, and read a capability of the first storage sub-profile at block 410. Partial matches may include scenarios such as, if the two names are different but start with the same alphanumeric characters, if the two names share one or more words, if one or more binary values or specific values of a constraint or property match, etc.).

Figure 5:
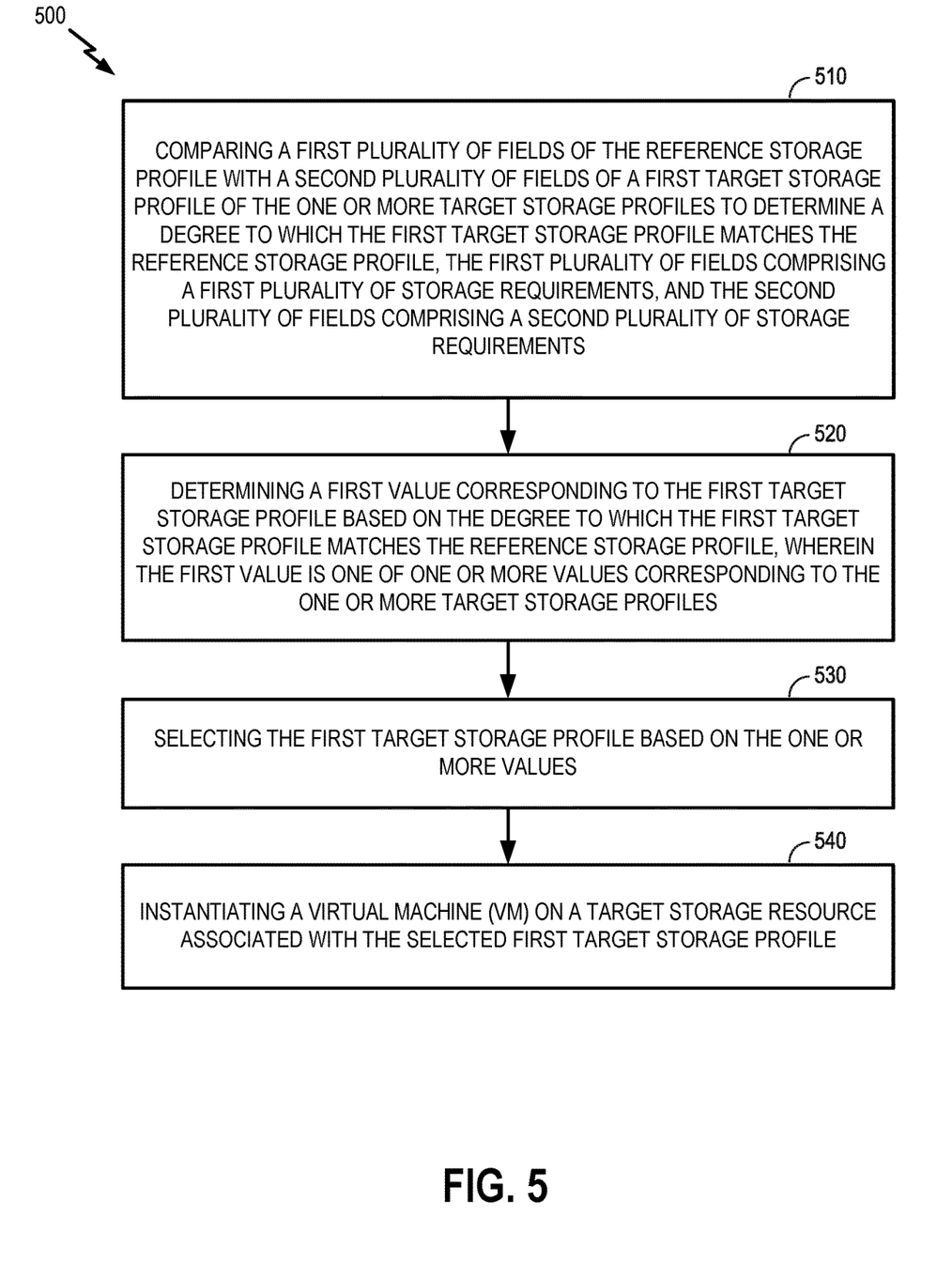
FIG. 5 is a flow chart that illustrates another exemplary method for determining a compatible target storage resource for recovery of a VM, according to some aspects of the disclosure.

FIG. 5 is a flow chart that illustrates an exemplary method 500 for determining a compatible target storage resource for recovery of a VM, according to some embodiments of the disclosure. In some examples, the method 500 may be carried out by a specialized processor or software (e.g., recovery manager 175/180 of FIG. 1) configured to run on a processor of a server (e.g., the management server 110/145 of FIG. 1) or any suitable computing device. In some examples, the method 500 may be carried out by any suitable apparatus or means for carrying out the functions or algorithms described below.

In certain aspects, in a first step 510, the method 500 includes comparing a first plurality of fields of a source storage profile with a second plurality of fields of a first target storage profile of the one or more target storage profiles to determine whether the first target storage profile satisfies a plurality of equality conditions, the plurality of equality conditions corresponding to the first plurality of fields, the first plurality of fields comprising a first plurality of storage requirements, and the second plurality of fields comprising a second plurality of storage requirements.

In a second step 520, the method 500 includes determining a first value corresponding to the first target storage profile based on which of the plurality of equality conditions the first target storage profile satisfies, wherein the first value is one of one or more values corresponding to the one or more target storage profiles.

In a third step 530, the method 500 includes selecting the first target storage profile based on the one or more values.

In a fourth step 540, the method 500 includes instantiating a virtual machine (VM) on a target storage resource associated with the selected first target storage profile.

In certain aspects, selecting the first target storage profile is based on comparing the first value to one or more additional values of the one or more values.

In certain aspects, selecting the first target storage profile comprises determining that the first value is less than the one or more additional values corresponding to one or more additional target storage profiles of the one or more target storage profiles.

In certain aspects, wherein selecting the first target storage profile comprises determining that the first value satisfies a threshold.

In certain aspects, each of the first plurality of fields and the second plurality of fields comprise at least one of: a profile name, a sub-profile, a capability, a constraint, and a property of the constraint, wherein the property comprises an ID and a property value.

In certain aspects, determining the first value comprises adjusting a first counter value based on whether the equality condition is satisfied for each of the first plurality of fields, wherein the first counter value is indicative of the first value.

In certain aspects, the method 500 further comprises adjusting the first counter value according to a degree to which one or more of the plurality of equality conditions are satisfied between each of the first plurality of fields and one or more of the second plurality of fields.

In certain aspects, the method 500 further comprises returning an error if the second plurality of fields of the first target storage profile does not include a first constraint, wherein the first constraint is included in the first plurality of fields of the source storage profile, and wherein the error is indicative of incompatibility between the first plurality of storage requirements and the second plurality of storage requirements.

In certain aspects, the constraint comprises a collection of properties for a single occurrence of a capability.

In certain aspects, the capability is a collection of constraints on one or more properties.

Additional Considerations

As described, embodiments described herein provide techniques for recovering a VM in a local or distributed storage system. Generally speaking, the various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. In addition, the various embodiments are described above in the context of SSDs. However, it should be understood that alternative embodiments may be practiced with other types of storage devices having performance characteristics that are similar to that of SSDs.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of comparing a reference storage profile with one or more target storage profiles, comprising:
    comparing a first plurality of fields of the reference storage profile with a second plurality of fields of a first target storage profile of the one or more target storage profiles to determine a degree to which the first target storage profile matches the reference storage profile, the first plurality of fields comprising a first plurality of storage requirements, and the second plurality of fields comprising a second plurality of storage requirements;
    determining a first value corresponding to the first target storage profile based on the degree to which the first target storage profile matches the reference storage profile, wherein the first value is one of one or more values corresponding to the one or more target storage profiles, wherein determining the first value comprises adjusting a first counter value based on whether an equality condition is satisfied for each of the first plurality of fields, and wherein the first counter value is indicative of the first value;
    selecting the first target storage profile based on the one or more values; and
    instantiating a virtual machine (VM) on a target storage resource associated with the selected first target storage profile.

2. The method of claim 1, wherein selecting the first target storage profile is based on comparing the first value to one or more additional values of the one or more values.

3. The method of claim 2, wherein selecting the first target storage profile comprises determining that the first value is less than the one or more additional values corresponding to one or more additional target storage profiles of the one or more target storage profiles.

4. The method of claim 1, wherein selecting the first target storage profile comprises determining that the first value satisfies a threshold.

5. The method of claim 1, wherein each of the first plurality of fields and the second plurality of fields comprise at least one of:
a name;
a sub-profile;
a capability;
a constraint; and
a property of the constraint, wherein the property comprises an ID and a property value.

6. The method of claim 1, wherein adjusting the first counter value is based on a degree to which one or more of a plurality of equality conditions are satisfied between each of the first plurality of fields and one or more of the second plurality of fields.

7. The method of claim 5, further comprising returning an error if the second plurality of fields of the first target storage profile does not include a first constraint, wherein the first constraint is included in the first plurality of fields of the reference storage profile, and wherein the error is indicative of incompatibility between the first plurality of storage requirements and the second plurality of storage requirements.

8. The method of claim 5, wherein the constraint comprises a collection of properties for a single occurrence of a capability.

9. The method of claim 5, wherein the capability is a collection of constraints on one or more properties.

10. A non-transitory computer-readable storage medium comprising instructions that, when executed in a computing device, cause the computing device to perform a method of selecting a target storage profile, the method comprising:
comparing a first plurality of fields of a reference storage profile with a second plurality of fields of a first target storage profile of one or more target storage profiles to determine a degree to which the first target storage profile matches the reference storage profile, the first plurality of fields comprising a first plurality of storage requirements, and the second plurality of fields comprising a second plurality of storage requirements;
determining a first value corresponding to the first target storage profile based on the degree to which the first target storage profile matches the reference storage profile, wherein the first value is one of one or more values corresponding to the one or more target storage profiles, wherein determining the first value comprises adjusting a first counter value based on whether an equality condition is satisfied for each of the first plurality of fields, and wherein the first counter value is indicative of the first value;
selecting the first target storage profile based on the one or more values; and
instantiating a virtual machine (VM) on a target storage resource associated with the selected first target storage profile.

11. The non-transitory computer-readable storage medium claim 10, wherein selecting the first target storage profile is based on comparing the first value to one or more additional values of the one or more values.

12. The non-transitory computer-readable storage medium of claim 11, wherein selecting the first target storage profile comprises determining that the first value is less than the one or more additional values corresponding to one or more additional target storage profiles of the one or more target storage profiles.

13. The non-transitory computer-readable storage medium of claim 10, wherein selecting the first target storage profile comprises determining that the first value satisfies a threshold.

14. The non-transitory computer-readable storage medium of claim 10, wherein each of the first plurality of fields and the second plurality of fields comprise at least one of:
a name;
a sub-profile;
a capability;
a constraint; and
a property of the constraint, wherein the property comprises an ID and a property value.

15. The non-transitory computer-readable storage medium of claim 10, wherein adjusting the first counter value is based on a degree to which one or more of a plurality of equality conditions are satisfied between each of the first plurality of fields and one or more of the second plurality of fields.

16. The non-transitory computer-readable storage medium of claim 14, wherein the method further comprises returning an error if the second plurality of fields of the first target storage profile does not include a first constraint, wherein the first constraint is included in the first plurality of fields of the reference storage profile, and wherein the error is indicative of incompatibility between the first plurality of storage requirements and the second plurality of storage requirements.

17. The non-transitory computer-readable storage medium of claim 14, wherein the constraint comprises a collection of properties for a single occurrence of a capability.

18. A computing device, comprising:
a processor; and
a memory communicatively coupled to the processor, wherein the memory includes a program executable in the processor and configured to cause the processor to perform a method for selecting a target storage profile, the method comprising:
comparing a first plurality of fields of a reference storage profile with a second plurality of fields of a first target storage profile of one or more target storage profiles to determine a degree to which the first target storage profile matches the reference storage profile, the first plurality of fields comprising a first plurality of storage requirements, and the second plurality of fields comprising a second plurality of storage requirements;
determining a first value corresponding to the first target storage profile based on the degree to which the first target storage profile matches the reference storage profile, wherein the first value is one of one or more values corresponding to the one or more target storage profiles, wherein determining the first value comprises adjusting a first counter value based on whether an equality condition is satisfied for each of the first plurality of fields, and wherein the first counter value is indicative of the first value;
selecting the first target storage profile based on the one or more values; and instantiating a virtual machine (VM) on a target storage resource associated with the selected first target storage profile.

* * * * *